April 17, 1962 C. H. ELBREDER ET AL 3,029,784
SALT WATER SHRIMP HATCHING TABLET COMPOSITION AND METHOD
Filed Sept. 6, 1960
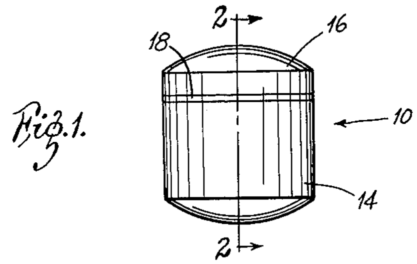
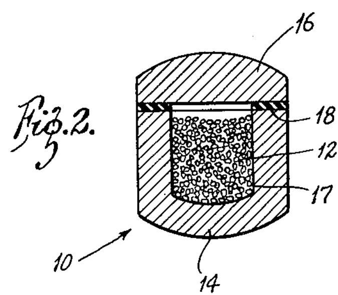
INVENTORS:
CHARLES H. ELBREDER,
EDWARD J. ROSS,
BY Kingsland, Rogers & Ezell
ATTORNEYS United States Patent Office 3,029,784
Patented Apr. 17, 1962

3,029,784

SALT WATER SHRIMP HATCHING TABLET COMPOSITION AND METHOD

Charles H. Elbreder, 14 Lynnbrook Drive, and Edward J. Ross, 4213 Prather Ave., both of St. Louis, Mo.

Filed Sept. 6, 1960, Ser. No. 53,996
3 Claims. (Cl. 119—2)

This invention relates to improvements in a chemical composition and method for hatching brine shrimp eggs, and, in particular, is concerned with a tablet composition that is used to contain the shrimp egg and which may be added to fresh water for hatching.

This invention is particularly applicable to the hatching of brine shrimp in fresh water and is also designed to be used in conventionally treated municipal or domestic waters. Such hatching of brine shrimp eggs in the past in such waters has been difficult, because of the difficulty of maintaining a constant pH and also because of the difficulty of compensating for free chlorine, which is injurious to the shrimp eggs.

By means of this invention there has been provided a composition and method for hatching brine shrimp eggs in fresh water of various types to insure the hatching of the eggs in a minimum of time. In particular, the chemical composition of this invention uses a brine simulating agent consisting of salt and a buffer agent to be added to the water to control the pH at a level of about 9. The buffer agent is quite important as conventional fresh waters occurring both naturally and in treated waters vary in pH from about 6.5 to 10.2. The chemical composition also can include, as a very important ingredient, a neutralizing agent for residual or free chlorine, which is quite conventionally contained in treated waters for removal of bacteria and the like. The presence of free chlorine in the amount of 0.1 to 2.0 parts per million, as is conventional in treated waters, is quite injurious to the shrimp eggs and the neutralizing agent employed in this invention completely neutralizes the free chlorine as it is used in an excess of the stoichiometric amount and reduces the free chlorine content to a zero level. The composition of this invention can also very desirably employ a nutrient agent to provide food for the hatched eggs. The combination of the above agents provides a chemical composition which very effectively makes possible the hatching of brine shrimp eggs in fresh waters of various types and the method can be employed very simply without any rigorous controls.

In particular, the invention in its most desirable embodiment takes the form of a tablet containing the shrimp eggs. The tablet may be in the form of a cup to provide a cavity with a cap placed on top of the cup member. The shrimp eggs are contained in the cavity. The composition of the tablet contains the abovementioned agents and the entire tablet is added to fresh water in a measured amount to provide for the hatching of the eggs. Thus, the only operation required takes the form of adding the shrimp egg tablet to water to provide for the hatching of the eggs.

This makes it very desirable where the shrimp are desired to be used by the average domestic homeowner for various purposes, such as use in aquariums and the like. The hatched shrimp may be used for any purpose, such as raising shrimp, providing food for aquarium fish and the like. Uses in pet shops and for other purposes are also made possible.

It is accordingly a primary object of this invention to provide a composition and method for hatching brine shrimp eggs in which a brine simulating agent such as salt and a buffer agent to control the pH are employed by addition to the fresh water in which the eggs are added.

Another object of the invention is to provide a composition and method for hatching shrimp eggs in which a brine simulating agent, a buffer agent to control the pH at a uniform level, and a neutralizing agent to render ineffective free chlorine in the water, are employed.

Still another object of the invention is to provide a tablet for live shrimp eggs in which the tablet has a cavity containing the eggs and the composition of the tablet is formed from a brine simulating agent, a buffer agent to control the pH of the water to which the tablet is added, and a neutralizing agent to render ineffective free chlorine in the water.

Yet a further object of this invention is to provide a composition and method of application for the hatching of brine shrimp employing a tablet comprised of a cup member and a cap to form a cavity containing shrimp eggs and in which the composition of the tablet includes a brine simulating agent, a buffer agent to control the pH level of the water, a neutralizing agent, and a binder agent in the form of a nutrient which holds and binds the cap to the cup member of the tablet.

Still a further object of this invention is to provide a composition and method of hatching brine shrimp that can be very simply formulated and employed for the hatching of shrimp at a low cost and with a minimum of process control.

Still further objects of this invention will appear in the detailed description which follows and will otherwise be apparent to those skilled in the art. For the purpose of illustration there is shown in the accompanying drawing a typical embodiment of a tablet that may be utilized as a result of this invention. It is to be understood that this drawing is for the purpose of example only and that the invention is not limited thereto.

In the drawing:

FIGURE 1 is a view in elevation of the tablet; and

FIGURE 2 is a view in section taken on the line 2—2 of FIGURE 1.

In the composition of this invention and method of treatment, a brine simulating agent is used for the addition to fresh water. This brine simulating agent is salt in the form of sodium chloride. Also, as a necessary ingredient is a buffer agent to control the pH level of the water. This buffer agent prevents variation in pH and stabilizes the pH at a level of about 9. A chlorine neutralizing agent is very desirably employed in waters that contain chlorine as is true for a large number of conventionally treated municipal and domestic waters. A nutrient agent is also desirable to employ as it makes possible the application of the hatching of the brine shrimp without the necessity of measuring and dosing additional food.

The brine simulating agent is, as previously mentioned, conventional salt. The salt in the form of sodium chloride is used in the treatment in sufficient amount to provide about three to four percent solution in the water by weight. This provides the most desirable environment for the hatched eggs.

The buffer agent employed is used to prevent the wide variation in pH occurring both in natural fresh waters and in municipally and domestically or industrially treated water. This pH level of the treated water, such as tap water and the like, varies from 6.5 to 10.2 and such variation is injurious to the hatching of the shrimp eggs. By means of the addition of a buffering agent the water can be adjusted in pH level to 9, regardless of whether the pH for the treated water is below 9 or above 9. Particularly, it has been found to be useful to employ as the buffering agent various alkali carbonates, hydroxides, phosphates, or borates. These have been found to be desirably soluble in water and non-toxic to the hatched shrimp. In particular, sodium borate has been found to be preferable. This may be employed in the form of borax, $Na_2B_4O_7.10H_2O$.

The chlorine neutralizing agent employed is desired to render ineffective residual free chlorine in treated waters. Chlorine treatment is quite conventional for municipal, industrial and domestic fresh water to remove bacteria and the level of free chlorine contained, conventionally 0.1 to 2.0 parts per million, is very injurious to the hatched shrimp and inhibits the hatching. In particular, the chlorine neutralizing agent should be a reducing agent that is water soluble and non-toxic. This agent when used in stoichiometric amounts completely removes free chlorine. The agents that can be employed are the soluble thiosulfates, the sulfites, and bisulfites, and, particularly, sodium sulfite is preferred, although sodium bisulfite and sodium thiosulfate may also be employed.

The nutrient is desired to be added to the composition to provide food for the newly hatched brine shrimp. This agent may consist of ground cereal or wheat flour, which may be mixed with shrimp eggs, as an example, although other agents and tabletings can be employed. The above agents can be added to the composition and are compatible therewith. Also, where the composition is employed in the form of the novel tablet composition of this invention, the nutrient agent may be in the form of a binder either alone or in addition to the nutrient agent in the tablet composition, per se. The binder employed in the tablet, whic hconstruction will be more fully described below, may be wheat paste, or various types of gums, or polyethylene glycols and the like, or any binder which lends itself to use as a nutrient for the hatched shrimp.

In the preferred form the composition and method of this invention contemplates the preparation of a special brine shrimp egg tablet. This tablet is shown in FIGURES 1 and 2 and is identified by the reference numeral 10. As shown in FIGURES 1 and 2, the tablet 10 comprises a cup-shaped member 14 closed by a cap member 16, the two defining a cavity 17. Within the cavity is disposed a quantity of shrimp eggs. The cap and the cup member are closed together by a binder 18, whose chemical composition is preferably a water soluble and edible nutrient as described above.

The composition of the tablet per se, that is the cup-shaped member 14 and the cap member 16, is made from the formulation of this invention comprising the brine simulating agent and the pH buffering agent. Preferably, also, a free chlorine neutralizing agent is employed as this provides an all-purpose tablet that can be used in any type of naturally-occurring or chemically-treated fresh water.

There is listed below in the example a typical formulation of the tablet according to this invention. The composition shown is preferable, but it will be understood that the range may be varied for the proportion of the ingredients as set forth below.

*Example*

| | |
|---|---|
| Sodium chloride | 80.00 parts by weight, range 70 to 95 parts. |
| Sodium borate | 19.99 parts by weight, range 5 to 30 parts. |
| Sodium sulfite | 0.01 parts by weight, range 0.005 to 0.1 part. |
| Total | 100.00 |

The tablet weight can be varied but for convenient use and simple application a tablet weight of about 16 grams is preferred, since this may be simply added to about one quart of water to provide for a hatch of the brine shrimp eggs in very easy method application, which is simple to follow. For such a tablet weight, the weight of the brine shrimp egg is approximately 0.5 gram and as a general description of the number of eggs there would be in this amount about 2,000 eggs, but it will be understood that this would vary as the size and weight of the eggs vary. For such a tablet weight the nutrient agent may be present in the amount of about 1 to 3 percent by weight. As mentioned previously, this nutrient may be in the form of an edible water soluble binder such as wheat paste, various types of gums, or the like. Alternatively, part of the nutrient agent may be tableted with the salt formulation, or, if desired, may be added into the cavity 17, together with the shrimp eggs. This provides a full range of application and use.

The tablet and method of this invention make possible the very convenient and simple hatching of brine shrimp in naturally occurring or treated fresh water. By the method of this invention the fresh water may be made to simulate brine and the pH can be particularly controlled at a stable level to enhance and accelerate the hatching of the shrimp eggs. Also, by the addition of the chlorine neutralizing agent the harmful effects of free chlorine are prevented. The preferable application is in the form of the tablet of this invention, which makes it very simple to provide for mixing as one tablet may be added to a quart of fresh water to provide the desired environment Thus, any unskilled user of the tablet, with the knowledge of the desired proportion to be employed, can very simply and competently carry out the hatching operation with a minimum of possibility of misunderstanding. Thus, there has been provided a composition and method that are very advantageous in employment and use, and which can be carried out with a minimum of control and expense.

It will be understood that various changes and modifications may be made within the formulation and method of the invention as will be well understood by those skilled in the art. Such changes and modifications are within the scope and teaching of this invention as defined by the claims appended hereto.

What is claimed is:

1. A tablet for hatching brine shrimp in fresh water comprising a hollow tablet forming a cavity containing shrimp eggs, said tablet being formed from a chemical composition comprising a brine simulating agent consisting of about 70 to 95% by weight of sodium chloride and a pH adjusting agent consisting of about 5 to 30% by weight of at least one member of the group consisting of an alkali borate, carbonate, hydroxide and phosphate and a residual chlorine neutralizing agent consisting of a water soluble salt of a sulfite, bisulfite and thiosulfate in the amount of about 0.005 to 0.1% by weight.

2. A tablet for hatching brine shrimp in fresh water comprising a hollow tablet forming a cavity containing shrimp eggs, said tablet being formed from a chemical composition comprising a brine simulating agent consisting of about 70 to 95% by weight of sodium chloride and a pH adjusting agent consisting of about 5 to 30% by weight of at least one member of the group consisting of an alkali borate, carbonate, hydroxide and phosphate and a residual chlorine neutralizing agent consisting of a water soluble salt of a sulfite, bisulfite and thiosulfate in the amount of about 0.005 to 0.1% by weight and about 1 to 3% by weight of a food agent.

3. The tablet of claim 2 in which the tablet is formed of a cup-shaped member and a cap member adhesively joined by an edible binder.

References Cited in the file of this patent

Sanders: Brian Shrimp Package, Mfg. by Sanders, Brian Shrimp Co., 800 Washington Blvd., Ogden, Utah.

Capet Aquarium Catalogue, The Capet Company, 6245 Duke St., Alexandria, Va., pages 4 and 6.